(12) United States Patent
Siegler et al.

(10) Patent No.: US 12,165,641 B2
(45) Date of Patent: Dec. 10, 2024

(54) HISTORY-BASED ASR MISTAKE CORRECTIONS

(71) Applicant: Google LLC, Mountain View, CA (US)

(72) Inventors: Patrick Siegler, Zurich (CH); Aurélien Boffy, Basel (CH); Ágoston Weisz, Zurich (CH)

(73) Assignee: Google LLC, Mountain View, CA (US)

(*) Notice: Subject to any disclaimer, the term of this patent is extended or adjusted under 35 U.S.C. 154(b) by 247 days.

(21) Appl. No.: 17/811,650

(22) Filed: Jul. 11, 2022

(65) Prior Publication Data

US 2024/0013782 A1 Jan. 11, 2024

(51) Int. Cl.
*G10L 15/22* (2006.01)
*G10L 15/08* (2006.01)

(52) U.S. Cl.
CPC ............. *G10L 15/22* (2013.01); *G10L 15/08* (2013.01); *G10L 2015/088* (2013.01)

(58) Field of Classification Search
CPC .... G10L 15/22; G10L 15/08; G10L 2015/088
See application file for complete search history.

(56) References Cited

U.S. PATENT DOCUMENTS

| | | | | |
|---|---|---|---|---|
| 6,718,304 B1* | 4/2004 | Tachimori | .......... | G01C 21/3608 704/238 |
| 8,019,748 B1* | 9/2011 | Wu | ..................... | G06F 16/3347 707/713 |
| 8,868,543 B1* | 10/2014 | Henzinger | .......... | G06F 16/9535 707/768 |

(Continued)

OTHER PUBLICATIONS

Jurafsky Daniel et al: "Speech and Language Processing" In: "Speech and Language Processing", Feb. 7, 2022 (Feb. 7, 2022), Speech and Language Processing an Introduction to Natural Language Processing, Computational Linguistics, and Speech Recognition, XP093080011, pp. 1-653, Retrieved from the Internet: URL: <https://web.archive.org/web/20220207180613if_/<https://web.stanford.eduPlurafsky>/slp3/ed3book_jan122022.pdf> chapter 11 chapter 26.

(Continued)

*Primary Examiner* — Bhavesh M Mehta
*Assistant Examiner* — Darioush Agahi
(74) *Attorney, Agent, or Firm* — Honigman LLP; Brett A. Krueger; Grant Griffith

(57) ABSTRACT

A method includes receiving follow-on audio data captured by an assistant-enabled device, the follow-on audio data corresponding to a follow-on query spoken by a user of the assistant-enabled device to a digital assistant subsequent to the user submitting a previous query to the digital assistant. The method also includes processing, using a speech recognizer, the follow-on audio data to generate multiple candidate hypotheses, each candidate hypothesis corresponding to a candidate transcription for the follow-on query and represented by a respective sequence of hypothesized terms. For each corresponding candidate hypothesis among the multiple candidate hypotheses, the method also includes determining a corresponding similarity metric between the previous query and the corresponding candidate hypothesis and determining a transcription of the follow-on query spoken by the user based on the similarity metrics determined for the multiple candidate hypotheses.

28 Claims, 7 Drawing Sheets

(56) References Cited

U.S. PATENT DOCUMENTS

| | | | |
|---|---|---|---|
| 9,576,578 B1* | 2/2017 | Skobeltsyn | G10L 15/22 |
| 11,141,129 B1* | 10/2021 | Trapero Martin | A61B 5/6823 |
| 11,526,512 B1* | 12/2022 | Halabi | G06F 40/289 |
| 2016/0179787 A1* | 6/2016 | Deleeuw | G10L 15/22 |
| | | | 704/9 |
| 2017/0060994 A1* | 3/2017 | Byron | G10L 15/22 |
| 2021/0097982 A1* | 4/2021 | Nowak-Przygodzki | |
| | | | G10L 15/22 |
| 2021/0174794 A1* | 6/2021 | Mont-Reynaud | G10L 15/22 |
| 2022/0180866 A1 | 6/2022 | Sharifi et al. | |
| 2022/0198151 A1* | 6/2022 | Park | G06F 40/44 |
| 2022/0310064 A1* | 9/2022 | Shao | G10L 15/22 |
| 2023/0186941 A1* | 6/2023 | Juneja | G10L 15/22 |
| | | | 704/239 |
| 2023/0206912 A1* | 6/2023 | Piersol | G10L 15/22 |
| | | | 704/232 |

OTHER PUBLICATIONS

International Search Report and Written Opinion relating to application No. PCT/US2023/027236, dated Oct. 11, 2023.

* cited by examiner

HISTORY-BASED ASR MISTAKE CORRECTIONS

TECHNICAL FIELD

This disclosure relates to history-based automatic speech recognition (ASR) mistake corrections.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. The devices may operate in a sleep state and initiate a wake-up process to perform speech recognition on an utterance directed to the system in response to detecting a hotword spoken by the user that precedes the utterance. The user may speak follow-on queries or commands after receiving the answer fielded by the computer-based system. Requiring the user to speak the hotword for each subsequent follow-on query or command is as much tiresome for the user as it is unnatural.

SUMMARY

One aspect of the disclosure provides a computer-implemented when executed on data processing hardware causes the data processing hardware to perform operations that include receiving follow-on audio data captured by an assistant-enabled device, the follow-on audio data corresponding to a follow-on query spoken by a user of the assistant-enabled device to a digital assistant subsequent to the user submitting a previous query to the digital assistant. The operations also include processing, using a speech recognizer, the follow-on audio data to generate multiple candidate hypotheses, each candidate hypothesis corresponding to a candidate transcription for the follow-on query and represented by a respective sequence of hypothesized terms. For each corresponding candidate hypothesis among the multiple candidate hypotheses, the operations also include determining a corresponding similarity metric between the previous query and the corresponding candidate hypothesis, and determining a transcription of the follow-on query spoken by the user based on the similarity metrics determined for the multiple candidate hypotheses. The similarity metric indicates a similarity between a topic associated with the corresponding candidate hypothesis and a topic associated with the previous query.

Implementations of the disclosure may include one or more of the following optional features. In some implementations, the operations also include determining a previous Query Based Salient Terms (QBST) vector associated with the previous query submitted by the user, and for each corresponding candidate hypothesis, determining a corresponding candidate QBST vector associated with the corresponding candidate hypothesis. Here, determining the corresponding similarity metric between the previous query and the corresponding candidate hypothesis includes determining the corresponding similarity metric between the previous QBST vector and the corresponding candidate QBST vector based on the previous QBST vector and the corresponding candidate QBST vector. In these implementations, the previous QBST vector may indicate a respective set of salient terms associated with the previous query and each corresponding candidate QBST vector may indicate a respective set of salient terms associated with the corresponding candidate hypothesis. In some examples, corresponding similarity metric indicates a topical drift between the previous QBST vector and the corresponding candidate QBST vector. In additional examples, the corresponding similarity metric includes a Cosine score between the previous QBST vector and the corresponding candidate QBST vector.

In some examples, the operations further include receiving initial audio data captured by the assistant-enabled device while the assistant-enabled device is in a sleep state, whereby the initial audio data includes a hotword and the previous query submitted by the user to the digital assistant such that the hotword when detected by the assistant-enabled device causes the assistant-enabled device to wake from a sleep state and trigger the speech recognizer to perform speech recognition on at least a portion of the initial audio data that includes the previous query. In these examples, after the speech recognizer performs speech recognition on at least the portion of the initial audio data, the operations also include instructing the assistant-enabled device to operate in a follow-on query mode. Here, receiving the follow-on audio data by the assistant-enabled device includes receiving the follow-on audio data during operation of the assistant-enabled device in the follow-on query mode, wherein the presence of the hotword is absent from the follow-on audio data.

In some implementations, the operations further include performing query interpretation on the transcription to identify an operation specified by the follow-on query, instructing the digital assistant to perform the operation specified by the follow-on query, and receiving, from the digital assistant, a follow-on response indicating performance of the operation specified by the follow-on query. In these implementations, the operations may also include presenting, for output from the assistant-enabled device, the follow-on response.

For each corresponding candidate hypothesis among the multiple candidate hypotheses generated by the speech recognizer, the operations may also include obtaining a corresponding likelihood score that the speech recognizer assigned to the corresponding candidate hypothesis and ranking the multiple candidate hypotheses based on the corresponding likelihood scores assigned to the multiple candidate hypothesis by the speech recognizer and the corresponding similarity score determined for each corresponding candidate hypothesis among the multiple candidate hypotheses. Here, determining the transcription of the follow-on query may be based on the ranking of the multiple candidate hypotheses.

Notably, the data processing hardware executes the speech recognizer and may reside on either one of the assistant-enabled device or a remote server. The remove server may be in communication with the assistant-enabled device via a network.

In some examples, the speech recognizer includes an end-to-end speech recognition model. In other examples, the speech recognizer includes an acoustic model and a language model. Furthermore, the assistant-enabled device may be in communication with one or more microphones configured to capture the follow-on audio data and initial audio data corresponding to the previous query. The assistant-enabled device may optionally include a battery-powered device.

Another aspect of the disclosure provides a system that includes data processing hardware and memory hardware in communication with the data processing hardware. The memory hardware stores instructions that when executed on the data processing hardware causes the date processing hardware to perform operations that include receiving follow-on audio data captured by an assistant-enabled device, the follow-on audio data corresponding to a follow-on query spoken by a user of the assistant-enabled device to a digital assistant subsequent to the user submitting a previous query to the digital assistant. The operations also include processing, using a speech recognizer, the follow-on audio data to generate multiple candidate hypotheses, each candidate hypothesis corresponding to a candidate transcription for the follow-on query and represented by a respective sequence of hypothesized terms. For each corresponding candidate hypothesis among the multiple candidate hypotheses, the operations also include determining a corresponding similarity metric between the previous query and the corresponding candidate hypothesis, and determining a transcription of the follow-on query spoken by the user based on the similarity metrics determined for the multiple candidate hypotheses. The similarity metric indicates a similarity between a topic associated with the corresponding candidate hypothesis and a topic associated with the previous query.

This aspect may include one or more of the following optional features. In some implementations, the operations also include determining a previous Query Based Salient Terms (QBST) vector associated with the previous query submitted by the user, and for each corresponding candidate hypothesis, determining a corresponding candidate QBST vector associated with the corresponding candidate hypothesis. Here, determining the corresponding similarity metric between the previous query and the corresponding candidate hypothesis includes determining the corresponding similarity metric between the previous QBST vector and the corresponding candidate QBST vector based on the previous QBST vector and the corresponding candidate QBST vector. In these implementations, the previous QBST vector may indicate a respective set of salient terms associated with the previous query and each corresponding candidate QBST vector may indicate a respective set of salient terms associated with the corresponding candidate hypothesis. In some examples, corresponding similarity metric indicates a topical drift between the previous QBST vector and the corresponding candidate QBST vector. In additional examples, the corresponding similarity metric includes a Cosine score between the previous QBST vector and the corresponding candidate QBST vector.

In some examples, the operations further include receiving initial audio data captured by the assistant-enabled device while the assistant-enabled device is in a sleep state, whereby the initial audio data includes a hotword and the previous query submitted by the user to the digital assistant such that the hotword when detected by the assistant-enabled device causes the assistant-enabled device to wake from a sleep state and trigger the speech recognizer to perform speech recognition on at least a portion of the initial audio data that includes the previous query. In these examples, after the speech recognizer performs speech recognition on at least the portion of the initial audio data, the operations also include instructing the assistant-enabled device to operate in a follow-on query mode. Here, receiving the follow-on audio data by the assistant-enabled device includes receiving the follow-on audio data during operation of the assistant-enabled device in the follow-on query mode, wherein the presence of the hotword is absent from the follow-on audio data.

In some implementations, the operations further include performing query interpretation on the transcription to identify an operation specified by the follow-on query, instructing the digital assistant to perform the operation specified by the follow-on query, and receiving, from the digital assistant, a follow-on response indicating performance of the operation specified by the follow-on query. In these implementations, the operations may also include presenting, for output from the assistant-enabled device, the follow-on response.

For each corresponding candidate hypothesis among the multiple candidate hypotheses generated by the speech recognizer, the operations may also include obtaining a corresponding likelihood score that the speech recognizer assigned to the corresponding candidate hypothesis and ranking the multiple candidate hypotheses based on the corresponding likelihood scores assigned to the multiple candidate hypothesis by the speech recognizer and the corresponding similarity score determined for each corresponding candidate hypothesis among the multiple candidate hypotheses. Here, determining the transcription of the follow-on query may be based on the ranking of the multiple candidate hypotheses.

Notably, the data processing hardware executes the speech recognizer and may reside on either one of the assistant-enabled device or a remote server. The remove server may be in communication with the assistant-enabled device via a network.

In some examples, the speech recognizer includes an end-to-end speech recognition model. In other examples, the speech recognizer includes an acoustic model and a language model. Furthermore, the assistant-enabled device may be in communication with one or more microphones configured to capture the follow-on audio data and initial audio data corresponding to the previous query. The assistant-enabled device may optionally include a battery-powered device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
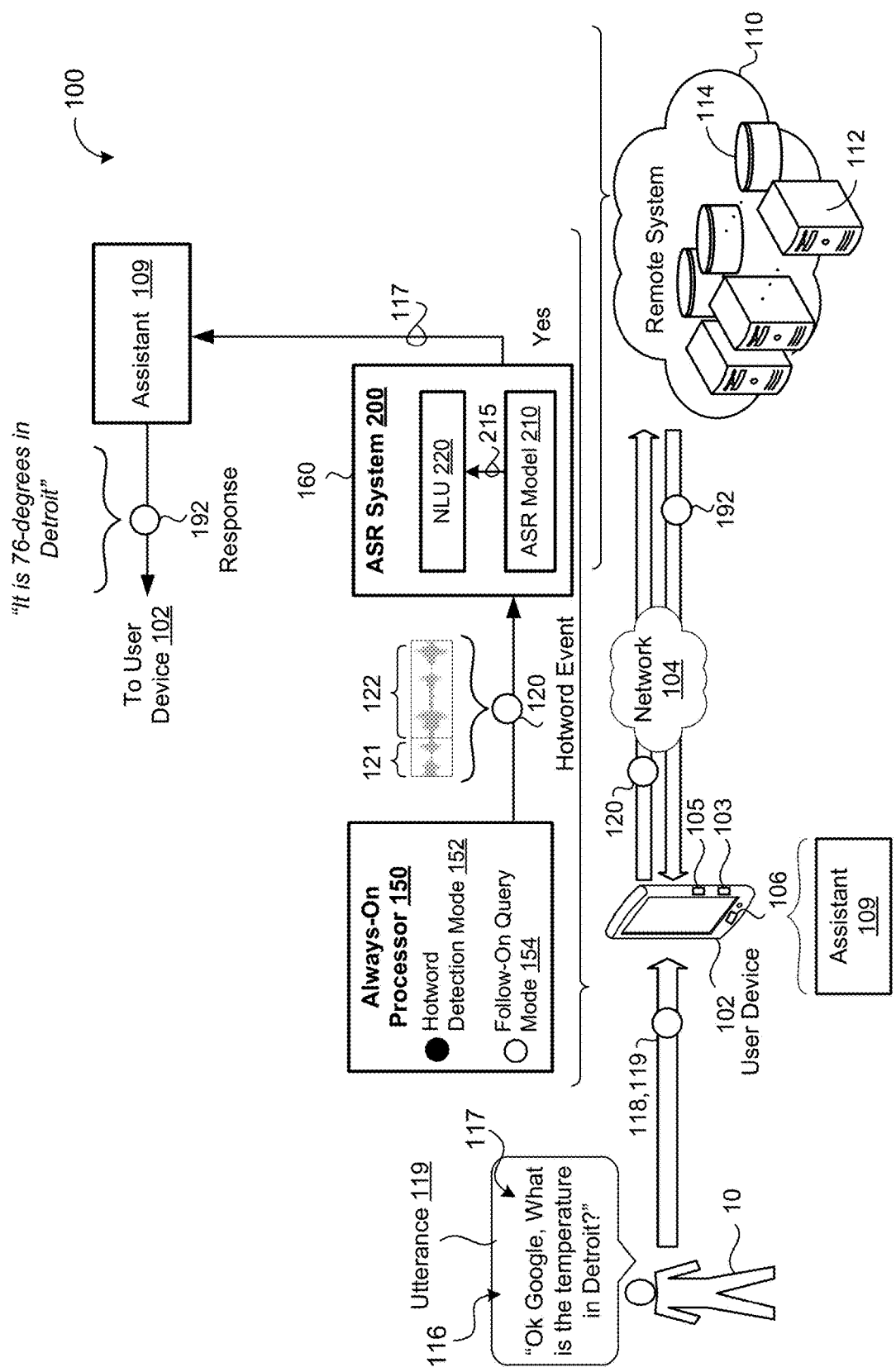
FIG. 1A is a schematic view of a user speaking an initial query preceded by a spoken hotword to invoke an assistant-enabled device to trigger an automatic speech recognition (ASR) system to process the initial query.

Automatic speech recognition (ASR) systems are becoming increasingly popular in client devices as the ASR systems continue to provide more accurate transcriptions of what users speak. Still, in some instances, ASR systems generate inaccurate transcriptions that misrecognize what the user actually spoke. This is often the case when words are acoustically similar or when the user speaks a unique word unknown to the ASR system. For example, "I say" and "Ice age" sound very much alike and it may be difficult for ASR systems to disambiguate which phrase the user intended to convey. In some examples, if the client device incorrectly transcribes "I say" when the user actually intended to convey "Ice age," the user may correct the transcription by using the client device (e.g., inputting the correct transcription via a keyboard of the client device).

Speech-based interfaces such as digital assistants are becoming increasingly prevalent across a variety of devices including, without limitation, mobile phones and smart speakers/displays that include microphones for capturing speech. The general way of initiating voice interaction with an assistant-enabled device (AED) is to speak a fixed phrase, e.g., a hotword, that when detected by the AED in streaming audio, triggers the AED to initial a wake-up process to begin recording and processing subsequent speech to ascertain a query spoken by the user. Thus, the hotword is an important component in the overall digital assistant interface stack as it allows users to wake up their AEDs from a low power state to a high power state so that the AEDs can proceed to perform more expensive processing such as full ASR or server-based ASR.

Often times, users have follow up queries after receiving a response to an initial query. For instance, a user may speak an initial query "what is the temperature in Detroit?" to an AED that returns a response "76-degrees Fahrenheit" to the user. Thereafter, the user may direct a follow-on query of "Is it Sunny?" to the AED. Here, a continued conversation mode or follow-on query mode keeps the AED in the high power state for a predefined amount of time after providing the response by leaving the microphone open and running the ASR (on-device and/or server-side) to process any speech to determine whether any of the subsequent speech is intended towards the AED. After the predefined amount of time has expired, the AED returns to the low power state.

However, processing in-coming audio while the AED is in the high power state to determine whether subsequent speech intended toward the AED comes with challenges so that the user experience is not degraded. For instance, subsequently captured speech may be processed by the ASR system and treated as a follow-on query even though the subsequent speech was not intended toward the AED (whether spoken by the user, another user, or background speech emanating from a nearby device such as a television or music player. In such scenarios when captured speech not intended for the AED is processed as a follow-on despite the speech not being intended for the AED, the AED may return an answer or perform some action that was never requested by the user. Moreover, the answer returned, or action performed, responsive to the unintended follow-on query is very likely to not even be related to the initial query spoken by the user that was preceded by the explicit hotword spoken by the user to invoke ASR in the first place. On the other hand, an initial query spoken by the user can be leveraged to improve accuracy and latency for transcribing a follow-on query spoken by the user based on the intuition that the follow-on query should be topically similar to the initial queries that proceeds the follow-on query.

Accordingly, implementations herein are directed toward a method of leveraging an initial query directed toward an AED for biasing selection of a speech recognition candidate among multiple speech recognition candidates for a follow-on query based on a similarity to the initial query. In particular, a user submits an initial query including a hotword and a query to an AED having an always-on digital signal processor (DSP) operating in a hotword detection mode. When the DSP operating the hotword detection mode detects a hotword in the initial query, the DSP initiates a wake-up process on a second processor to perform more expensive processing such as full ASR to provide a response to the initial query. The second processor may include an application processor (AP) or other type of system-on-a-chip (SoC) processor.

In response to receiving the response to the initial query, the AED instructs the second processor to remain awake to operate in a follow-on query mode (also referred to as 'continued conversation mode') to permit the ASR system to process any follow-on queries that the user may speak without requiring the user to repeat speaking the hotword. While in the continued conversation mode, the ASR system (executing on the second processor and/or on a server in communication with the second processor) receives follow-on audio data corresponding to a follow-on query spoken by the user and processes the audio data to generate multiple candidate hypotheses each corresponding to a candidate transcription for the follow-on query and represented by a respective sequence of hypothesized terms (e.g., words). Here, the ASR system generates a respective likelihood score for each of the candidate hypotheses that indicates a probability that the candidate hypothesis is a correct transcription for the follow-on query spoken by the user. Implementations herein are specifically directed toward the ASR system determining a similarity metric between the initial query and each candidate hypothesis among the multiple candidate hypotheses (or among an N-best list of candidate hypotheses having the highest likelihood scores among the multiple candidate hypotheses), and thereafter using these similarity metrics to bias selection of the candidate hypothesis that is associated with a topic most similar to a topic of the initial query. As described in greater detail below, the similarity metric determined between the initial query and each candidate hypothesis may be based on a respective Query Based Salient Terms (QBST) vector generated for the initial query and each of the candidate hypotheses.

The user may explicitly opt-in to enable functionality of the follow-on query mode and may opt-out to disable the functionality of the follow-on query mode. When the follow-on query mode is disabled, the second processor will revert back to the sleep state after the initial query is processed and will only wake-up to process subsequent speech when invoked by the always-on DSP responsive to detecting the hotword. Implementations described herein directed toward using the similarity metric based on the QBST vector are equally applicable to scenarios when the follow-on query is spoken by the user when the follow-on query mode is disabled or the follow-on query is spoken after the follow-on query mode lapses and the second processor reverts back to the sleep state. Accordingly, the follow-on query may correspond to any query submitted after the initial query such that the user may have to speak a predetermined hotword or perform some other action (e.g., gesture, eye gaze, raise user device, etc.) to wake-up and invoke the second processor to process the follow-on query.

Figure 1B:
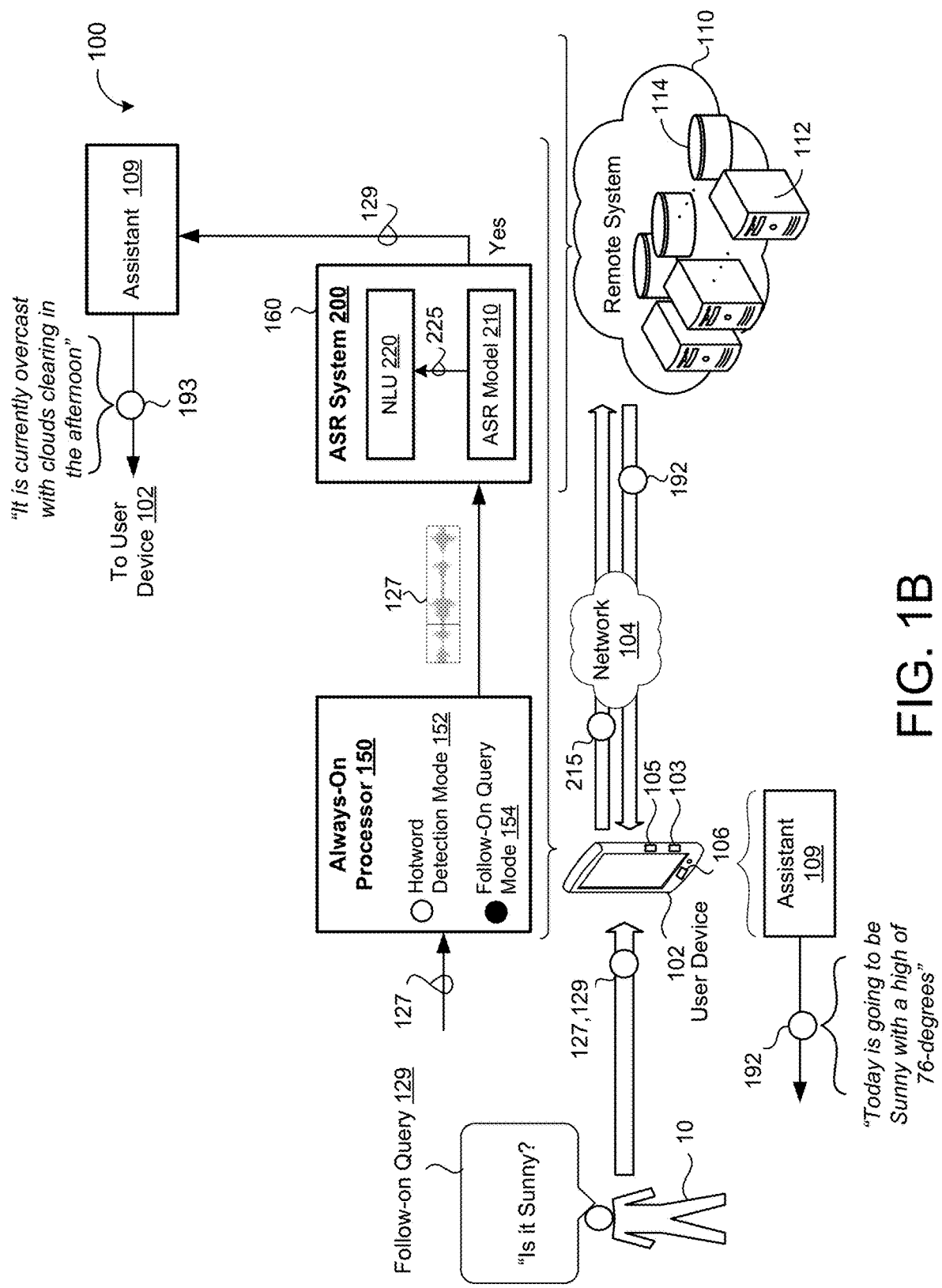
FIG. 1B is a schematic view of the user speaking a follow-on query that is not preceded by the hotword after receiving an answer to the initial query of FIG. 1A and the ASR system processing the follow-on query.

Referring to FIGS. 1A and 1B, in some implementations, an example system 100 includes an AED (i.e., user device) 102 associated with one or more users 10 and optionally in communication with a remote system 110 via a network 104. The AED 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 105. The AED 102 includes or is in communication with one or more microphones 106 for capturing streaming audio 118 in the environment of the AED 102 that may include utterances 119, 129 spoken by the respective user 10. The remote system 110 may be a single computer, multiple computers, or a distributed system (e.g., a cloud environment) having scalable/elastic computing resources 112 (e.g., data processing hardware) and/or storage resources 114 (e.g., memory hardware).

The data processing hardware 103 of the AED 102 includes a first processor 150 and a second processor 160. The first processor 150 may include an always-on DSP 150 (also referred to as DSP 150) that is configured to detect the presence of hotword(s) 116 in streaming audio 118 without performing semantic analysis or speech recognition processing on the streaming audio 118. The DSP 150 may receive the streaming audio 118 including the acoustic features extracted by an acoustic feature extractor from an utterance 119 spoken by a user 10. The DSP (i.e., first processor) 150, and more generally the AED 102, may operate in a hotword detection mode (FIG. 1A) 152 and a follow-on query mode (i.e., follow-on mode) (FIG. 1B) 154. In some examples, due to storage/memory/processing constraints, the DSP 150 only operates in one of the hotword detection mode or the follow-on query mode at a time. That is, in these examples, either the hotword detection mode 152 is enabled and the follow-on mode 154 is disabled or the hotword detection mode 152 is disabled and the follow-on mode 154 is enabled. In other examples, however, operation of the DSP 150 in the hotword detection mode 152 remains enabled while the DSP 150 simultaneously operates in the follow-on query mode 154. As will become apparent, the always-on processor 150 may operate in the hotword detection mode 152 while the AED 102 is in a low power state and the second processor 160 is asleep. While the always-on processor 150 is in the follow-on query mode 154, the second processor 160 may be awake/active for performing speech recognition on follow-on audio data 127 characterizing a follow-on query. Alternatively, second processor 160 may be asleep while the always-on processor 150 operates in the follow-on query mode 152 such that the always-on processor 152 may perform voice activity detection (VAD) on the follow-on audio data 127 and only trigger the second processor 160 to wake from the sleep state to perform speech recognition on the follow-on audio data 127 when the VAD determines that the follow-on audio data 127 includes human speech.

Referring now to FIG. 1A, in some implementations, the always-on DSP 150 operates in the hotword detection mode 152 while the follow-on query mode 154 is disabled and the second processor 160 is asleep. During operation in the hotword detection mode 152, the DSP 150 is configured to detect the presence of the hotword 116 "Ok Google" in streaming audio 118 to initiate a wake-up process on the second processor 160 for processing the hotword 116 and/or an initial query 117 following the hotword 116 in the streaming audio 118. In the example shown, the utterance 119 includes the hotword 116, "Ok Google", followed by an initial query 117, "What is the temperature in Detroit?" The AED 102 may extract acoustic features from the streaming audio 118 and store the extracted acoustic features in a buffer of the memory hardware 105 for use in detecting whether or not the streaming audio 118 includes the presence of the hotword 116. The DSP 150 may execute a hotword detection model configured to generate a probability score that indicates a presence of the hotword 116 in the acoustic features of the streaming audio 118 captured by the AED 102, and detect the hotword 116 in the streaming audio 118 when the probability score satisfies a hotword detection threshold. The DSP 150 may include multiple hotword detection models each trained to detect a different hotword associated with a particular term/phrase. These hotwords may be predefined hotwords and/or custom hotwords assigned by the user 10. In some implementations, the hotword detection mode includes a trained neural network-based model received from the remote system 110 via the network 104.

In the example shown, the DSP 150 may determine that the utterance 119 "Ok Google, what is the temperature in Detroit?" includes the hotword 116 "Ok Google" when the DSP 150 detects acoustic features in the streaming audio 118 that are characteristic of the hotword 116. For example, the DSP 150 may detect that the utterance 119 "Ok Google, what is the temperature in Detroit?" includes the hotword 116 "Ok Google" based on generating MFCCs from the audio data and classifying that the MFCCs include MFCCs that are similar to MFCCs that are characteristic of the hotword "Ok Google" as stored in a hotword detection model. As another example, DSP 150 may detect that the utterance 119 "Ok Google, What is the temperature in Detroit?" includes the hotword 116 "Ok Google" based on generating mel-scale filterbank energies from the audio data and classifying that the mel-scale filterbank energies include mel-scale filterbank energies that are similar to mel-scale filterbank energies that are characteristic of the hotword "OK Google" as stored in the hotword detection model.

In response to detecting the presence of the hotword 116 in the streaming audio 118 corresponding to the utterance 119 spoken by the user 10, the DSP 150 provides audio data 120 characterizing the hotword event to initiate a wake-up process on the second processor 160 for confirming the presence of the hotword 116. The audio data (interchangeably referred to as hotword event) 120 includes a first portion 121 characterizing the hotword 116 and a second portion 122 characterizing the initial query 117. Here, the second processor 160 may execute a more robust hotword detection model to confirm whether the audio data 120 includes the hotword 116. Additionally or alternatively, the second processor 160 may execute speech recognition on the audio data 120 via an automatic speech recognition (ASR) model 210 of an ASR system 200 to confirm whether the audio data 120 includes the hotword.

When the second processor 160 confirms that the audio data 120 includes the hotword 116, the second processor 160 may execute the ASR model 210 to process the audio data 120 to generate a speech recognition result 215 and execute a natural language understanding (NLU) module 220 of the ASR system 200 to perform semantic interpretation on the speech recognition result 215 to determine that the audio data 120 includes the initial query 117 for a digital assistant 109 to perform an operation. In this example, the ASR model 210 may process the audio data 120 to generate a speech recognition result 215 for "What is the temperature in Detroit?" that the NLU module 220 may identify as the initial query 117 for the digital assistant 109 to perform the operation of fetching a response 192 (i.e., answer to the initial query 117) that indicates "It is 76-degrees in Detroit". The digital assistant 109 may provide the response 192 for output from the AED 102. For instance, the digital assistant 109 may audibly output the response 192 from the AED 102 as synthesized speech and/or display a textual representation of the response 192 on a screen of the AED 102.

In some implementations, the ASR system 200 including the ASR model 210 and NLU module 220 is located on the remote system 110 in addition to, or in lieu of, the AED 102. Upon the DSP 150 triggering the second processor 160 to wake-up responsive to detecting the hotword 116 in the utterance 119, the second processor may transmit the audio data 120 corresponding to the utterance 119 to the remote system 110 via the network 104. The AED 102 may transmit the first portion 121 of the audio data 120 that includes the hotword 116 for the remote system 110 to confirm the presence of the hotword 116 performing speech recognition via the ASR model 210. Alternatively, the AED 102 may transmit only the second portion 122 of the audio data 120 that corresponds to the initial query 117 spoken in utterance 119 after the hotword 116 to the remote system 110. The remote system 110 executes the ASR model 210 to generate the speech recognition result 215 for the audio data 120. The remote system 110 may also execute the NLU module 220 to perform semantic interpretation on the speech recognition result 215 to identify the initial query 117 for the digital assistant 109 to perform the operation. Alternatively, the remote system 110 may transmit the speech recognition result 215 to the AED 102 and the AED 102 may execute the NLU module 220 to identify the initial query 117.

The digital assistant 109 may be located on the remote system 110 and/or the AED 102. The digital assistant 109 is configured to perform the operation specified by the initial query 117 from the second processor 160. In some examples, the digital assistant 109 accesses a search engine to fetch the response 192 associated with the initial query 117. In other examples, the digital assistant 109 accesses memory hardware 105 of the AED 102 and/or the memory hardware 114 of the remote system to fetch the response 192 associated with the initial query 117. Alternatively, the digital assistant 109 performs an operation associated with the initial query 117 (i.e., "call mom").

In some implementations, the user 10 has a follow-on query based on the response 192 to the initial query 117. That is, after receiving the response 192 that "it is 76-degrees in Detroit," the user 10 may have a follow-on query inquiring about additional weather conditions in Detroit. Current techniques allow for users to provide follow-on queries without requiring the user to re-speak the hotword by keeping the second processor 160 awake to process all of the audio data that follows the initial query 117 for a predetermined amount of time before returning to the sleep state. That is, the ASR system 200 executing on the second processor 160 and/or remote system 100 may continuously perform speech recognition and/or semantic interpretation on all subsequent audio data captured by the user device 102 during the follow-on query model 154 to determine whether the user 10 submitted a follow-on query for the digital assistant 109 to perform an operation. As described in greater detail below with reference to FIGS. 1B and 2, the ASR system 200 may leverage the initial query 117 (and corresponding transcription 215) to determine a similarity metric between the initial query 117 and each one of multiple candidate hypotheses 225 (FIGS. 1B and 2) output by the ASR model 210 responsive to processing follow-on audio data 127 (FIGS. 1B and 2) captured by the user device 102 during the follow-on query mode 154. The candidate hypothesis 225 associated with the highest similarity metric may indicate the candidate hypothesis associated with a topic most similar to a topic associated with the initial query, thereby enabling the ASR system 200 to select this candidate hypothesis 225 as the final transcription 175 for the follow-on query 129.

Referring now to FIG. 1B, in response to receiving the response 192 to the initial query 117 submitted by the user 10, the digital assistant 109 instructs the DSP 150 (and optionally the second processor 160) to operate in the follow-on query mode 154. Here, instructing the DSP 150 to operate in the follow-on query mode 154 may cause the hotword detection mode 152 to disable. The first processor 150 and/or second processor 160, while operating in the follow-on mode 154, receives follow-on audio data 127 corresponding to a follow-on query 129 spoken by the user 10 and captured by the AED 102. In the example shown, the user 10 speaks the follow-on query 129 "Is it Sunny?" in response to the AED 102 providing the user 10 the response 192 "It is 76-degrees in Detroit." Notably, the user 10 simply speaks the follow-on query 129 without speaking the hotword 116 a second time as the user 10 spoke when speaking the initial utterance 119 in FIG. 1A. However, in some other examples, the follow-on query 129 includes a hotword 116.

In some examples, during operation in the follow-on query mode 154, the DSP 152 or second processor 160 executes a voice activity detection (VAD) that is trained to determine whether or not voice activity is present in the follow-on audio data 127. That is, the VAD model determines whether the follow-on audio data 127 includes voice activity, such as speech spoken by a human, or includes non-voice activity audio (i.e., stereo, speakers, background noise, etc.). The VAD model may be trained to output a voice activity score that indicates a likelihood that the follow-on audio data 127 includes voice activity. Here, the first processor 150 or second processor 160 may determine that the follow-on audio data 127 includes voice activity when the voice activity score satisfies a voice activity threshold. In some examples, the VAD model outputs a binary voice activity indication, where "1" denotes "Yes" and "0" denotes "No" indicating that the follow-on audio data 127 does ("Yes") or does not ("No") include voice activity. The VAD model may be trained to distinguish human speech from synthetic/synthesized speech. The detection of voice activity may cause the first processor 150 and/or the second processor 160 to invoke the ASR system 200 to perform speech recognition and semantic analysis on the follow-on audio data 127 to determine whether follow-on audio data 127 includes the follow-on query 129 specifying a subsequent operation for the digital assistant 109 to perform.

Accordingly, the ASR model 210 may process the follow-on audio data 127 to generate multiple candidate hypothesis 225 for the follow-on audio data 127. The ASR system 200 may also execute the NLU module 220 to perform semantic interpretation on one or more of the candidate hypotheses 225 to identify the follow-on query 129 to submit to the digital assistant 109. In the example shown, the ASR system 200 determines that the follow-on audio data 127 corresponds to the follow-on query 129 for "Is it sunny?" and the assistant 109 retrieves a follow-on response 193 for the follow-on query 129. Here, the second processor 160 provides the follow-on response 193 from the assistant 109 as output from the AED 102 in the form of synthesized speech and/or text to indicate that "It is currently overcast with clouds clearing in the afternoon."

Alternatively, the ASR system 200 may ultimately determine that upon processing the follow-on audio data 127, the follow-on audio data 127 is not directed toward the AED 102, and thus, there is no follow-on query 129 for the digital assistant 109 to perform. In this scenario, the second processor 160 may provide an indication that no follow-on query exists in the follow-on audio data 127 and return to the sleep state or remain in the awake state for a predetermined amount of time. In some examples, the second processor 160 prompts the user 10 to repeat the follow-on query 129 responsive to the indication that no follow-on query 129 exists in the follow-on audio data 127.

As described above with reference to FIG. 1A, the ASR model 210 and NLU module 220 may be located on the remote system 110 in addition to, or in lieu of the AED 102. Here, the AED 102 may transmit the follow-on audio data 127 to the remote system 110 via the network 104, whereby the remote system 110 may execute the ASR model 210 to generate candidate hypotheses 225 for the audio data 120. The remote system 110 may also execute the NLU module 220 to perform semantic interpretation on one or more of the candidate hypotheses 225 to identify the follow-on query 129 for the digital assistant 109 to perform the operation. Alternatively, the remote system 110 may transmit one or more of the candidate hypotheses 225 to the AED 102 and the AED 102 may execute the NLU module 220 to identify the follow-on query 129.

Figure 2:
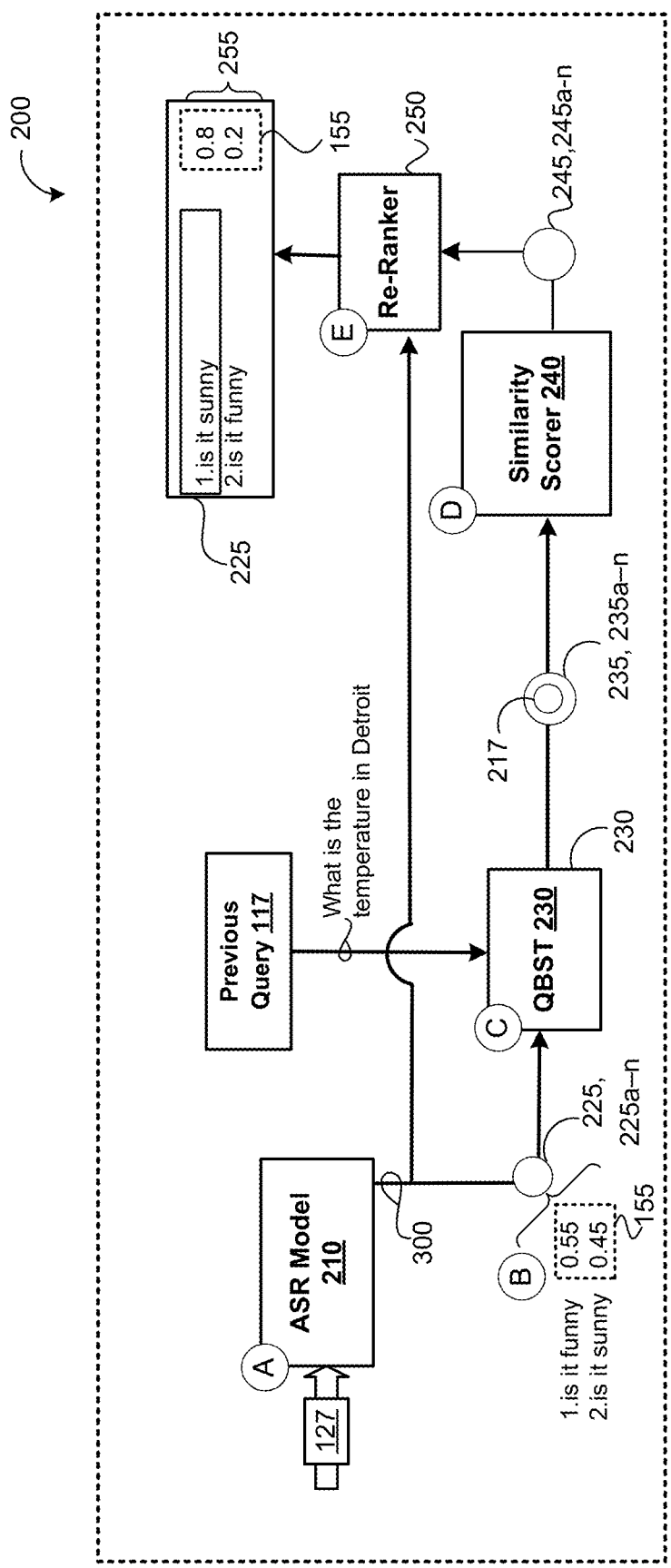
FIG. 2 is a schematic view of the ASR system of FIGS. 1A and 1B selecting a best candidate hypothesis in a lattice of speech recognition hypotheses for the follow-on query of FIG. 1A based on a similarity to the initial query issued by the user in FIG. 1A.

FIG. 2 illustrates an example ASR system 200 that biases selection of the multiple candidate hypotheses 225, 225a—n output by the ASR model 210 for the follow-on audio data 127 based on a topical similarity to one or more previous queries 117. While the example herein refers to the previous query 117 as the initial query in the conversation with the digital assistant 109, the topical similarity associated with any of one or more queries prior to the current follow-on query 127 may be leveraged for selecting the candidate hypothesis 225 as the transcription for the follow-on query 127. The ASR system 200 includes the ASR model 210, a Query Based Salient Terms (QBST) module 230, a similarity scorer 240, and a re-ranker 250. FIG. 2 shows operations (A) to (E) which illustrate a flow of data. As described herein, the AED 102 or the remote system 110 performs operations (A) to (E). In some examples, the AED 102 performs all the operations (A) to (E) entirely on-device, while in other examples, the remote system 110 performs all the operations (A) to (E). In some additional examples, the AED 102 performs a first portion of the operations while the remote system performs a second portion of the operations.

In the example shown, during operation (A), the ASR system 200 receives the follow-on audio data 127 captured by the microphone(s) 106 of the AED 120 and the ASR model 210 processes the follow-on audio data 127 to determine/generate the multiple candidate hypotheses 225 for the follow-on query 129. Here, each candidate hypothesis 225 corresponds to a candidate transcription for the follow-on query 129 and is represented by a respective sequence of hypothesized terms. For example, the data processing hardware 105 of the AED 102 may execute the ASR model 210 for producing a word lattice 300 indicating the multiple candidate hypotheses transcriptions 225 that may be possible for the follow-on query 129 based on the follow-on audio data 127. The ASR model 210 may evaluate potential paths through the word lattice 300 to determine the multiple candidate hypotheses 225.

Figure 3A:
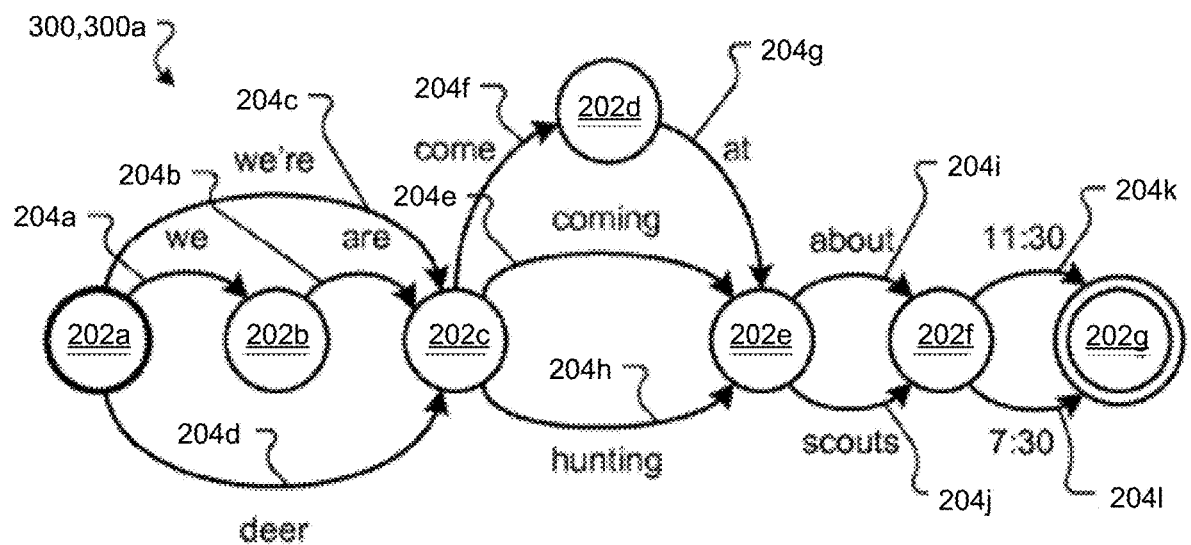
FIGS. 3A and 3B are schematic views of diagrams that illustrate examples of word lattices.

FIG. 3A is illustrates an example of a word lattice 300, 300a that may be provided by the ASR model 210 of FIG. 2. The word lattice 300a represents multiple possible combinations of words that may form different candidate hypotheses 225 for a follow-on query 129 while the AED 102 operates in the continued conversation model (i.e., follow-on query mode).

The word lattice 300a includes one or more nodes 202a—g that correspond to the possible boundaries between words. The word lattice 300a includes multiple edges 204a-1 for the possible words in the candidate hypotheses that result from the word lattice 300a. In addition, each of the edges 304a-1 can have one or more weights or probabilities of that edge being the correct edge from the corresponding node. The weights are determined by the ASR model 210 and can be based on, for example, a confidence in the match between the follow-on audio data 127 and the word for that edge and how well the word fits grammatically and/or lexically with other words in the word lattice 300a.

For example, initially, the most probable path (e.g., most probable candidate hypothesis 225) through the word lattice 300a may include the edges 204c, 204e, 204i, 204k, which have the text "we're coming about 11:30." A second best path (e.g., second best candidate hypothesis 225) through the word lattice 300a may include the edges 204d, 204h, 204j, 2041, which have the text "deer hunting scouts 7:30."

Each pair of nodes may have one or more paths corresponding to the alternate words in the various candidate hypotheses 225. For example, the initial most probable path between the node pair beginning at node 202a and ending at the node 202c is the edge 204c "we're." This path has alternate paths that include the edges 204a, 204b "we are" and the edge 204d "deer."

Figure 3B:
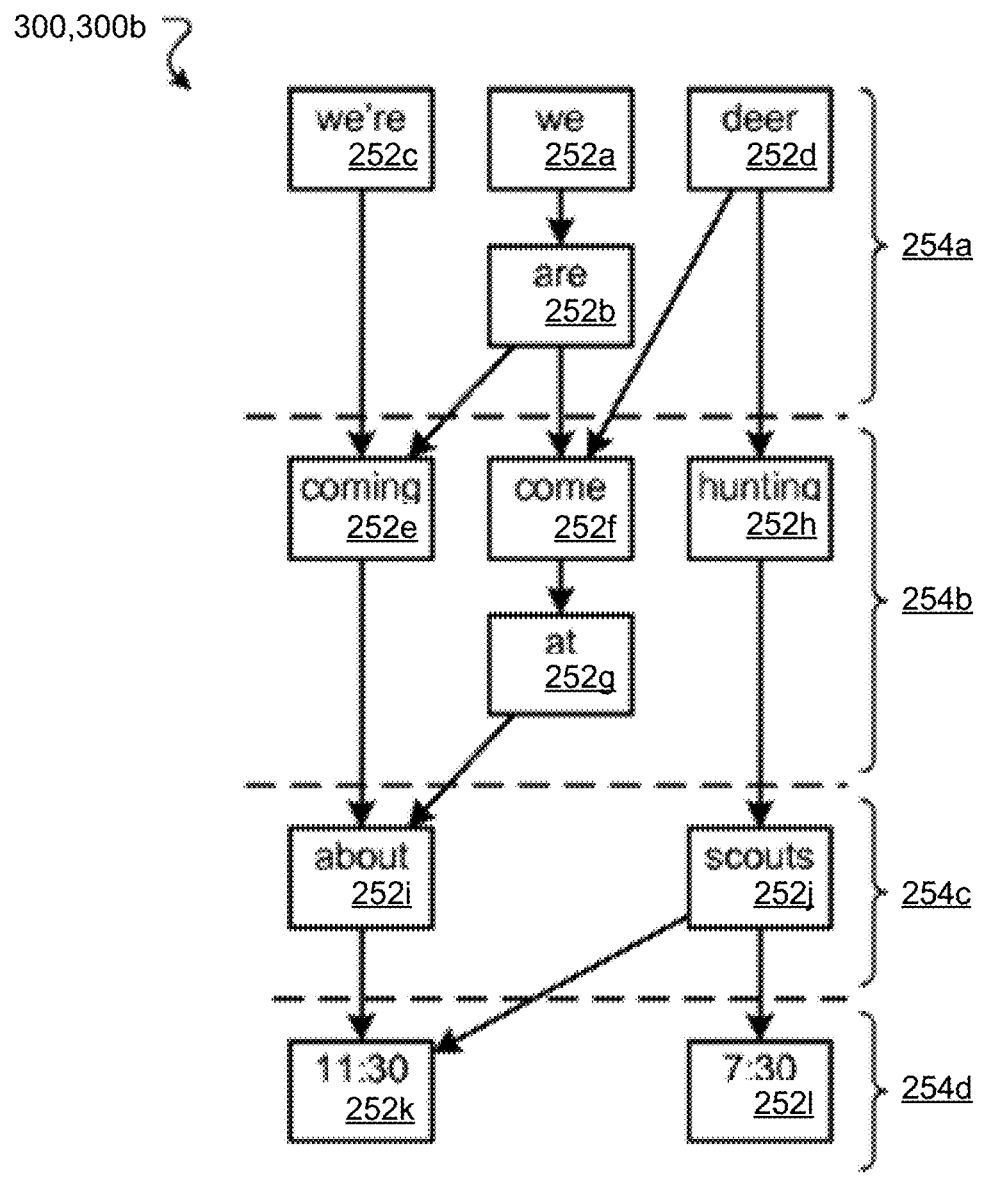

FIG. 3B is an example of a hierarchical word lattice 300, 300b that may be provided by the ASR model 210 of FIG. 2. The word lattice 300b includes nodes 252a-1 that represent words that make up the various candidate hypotheses 225 for a follow-on query 129 while the AED 102 operates in the continued conversation model (i.e., follow-on query mode). The edges between the nodes 252a-1 show that the possible candidate hypotheses 225 include: (1) the nodes 252c, 252e, 252i, 252k "we're coming about 11:30"; (2) the nodes 252a, 252b, 252e, 252i, 252k "we are coming about 11:30"; (3) the nodes 252a, 252b, 252f, 252g, 252i, 252k "we are come at about 11:30"; (4) the nodes 252d, 252f, 252g, 252i, 252k "deer come at about 11:30"; (5) the nodes 252d, 252h, 252j, 252k "deer hunting scouts 11:30"; and (6) the nodes 252d, 252h, 252j, 2521 "deer hunting scouts 7:30."

Again, the edges between the nodes 252a-1 may have associated weights or probabilities based on the confidence in the speech recognition (e.g., candidate hypothesis) and the grammatical/lexical analysis of the resulting text. In this example, "we're coming about 11:30" may currently be the best hypothesis and "deer hunting scouts 7:30" may be the next best hypothesis. One or more divisions, 254a-d, can be made in the word lattice 300b that group a word and its alternates together. For example, the division 254a includes the word "we're" and the alternates "we are" and "deer." The division 252b includes the word "coming" and the alternates "come at" and "hunting." The division 254c includes the word "about" and the alternate "scouts" and the division 254d includes the word "11:30" and the alternate "7:30."

Referring back to FIG. 2, the ASR model 210 may generate the multiple candidate hypotheses 225 from the word lattice 300. That is, the ASR model 210 generates likelihood scores 155 for each of the candidate hypotheses 225 of the word lattice 300. Each likelihood score 155 indicates a probability that the candidate hypotheses 225 is correct (e.g., matches the utterance of the follow-on query 129 spoken by the user 10). Each likelihood score 155 may include a combination of an acoustic modeling score and/or a prior likelihood score. In some implementations, the ASR model 210 includes an end-to-end (E2E) speech recognition model configured to receive the follow-on audio data 127 and generate the word lattice 300. In particular, the E2E speech recognition model processes the follow-on audio data 127 to generate corresponding likelihood scores 155 for each of the multiple candidate hypotheses 225 from the word lattice 300. In these implementations, the ASR model 210 may utilize an integrated or external language model for generating the likelihood scores 155. In some examples, the ASR model 210 includes a separate acoustic model, language model, and/or pronunciation model. The ASR model 210 may share an acoustic model and a language model with an additional hypothesis scorer (e.g., acoustic model and language model) or have an independent acoustic model and language model. As used herein, the ASR model 210 may be interchangeably referred to as a 'speech recognizer' that includes a single E2E neural network or a combination of separate acoustic, language, and/or pronunciation models.

During operation (B), the ASR system 200 identifies a set of highest-ranking candidate hypotheses 225 from the multiple candidate hypotheses 225 in the word lattice 300. For example, using likelihood scores 155 from the ASR model 210, the ASR system 200 selects n candidate hypotheses 225 with the highest likelihood scores 155, where n is an integer. In some instances, the ASR system 200 selects candidate hypotheses 225 with likelihood scores 155 that satisfy a likelihood score threshold. Optionally, the ASR model 210 may rank the set of highest-ranking candidate hypotheses 225 using the likelihood scores 155.

Continuing with the example of FIGS. 1A and 1B, the ASR model 210 generates candidate hypotheses 225 for the follow-on query "Is it sunny?" spoken by the user 10. In this example, the top two candidate transcriptions (e.g., the two that are most likely to be correct) are selected as the set of highest ranking candidate hypotheses 225. For simplicity, only the top two candidate hypotheses 225 are depicted in step B, and thus, the set of highest ranking candidate hypotheses 225 may include a set of two or more highest ranking candidate hypotheses 225 from the word lattice 300. The highest ranking candidate hypotheses 225 include a first candidate hypothesis 225 "is it funny" with a likelihood score 155 of 0.55 and a second candidate hypotheses 135 "is it sunny" with a likelihood score 155 of 0.45. Here, a higher likelihood score 155 indicates a greater confidence that the candidate hypothesis 135 is correct. Notably, the first candidate hypothesis ("is it funny") 225 having the highest likelihood score 155 does not include the utterance of the follow-on query 129 actually spoken by the user 10. Accordingly, if the ASR system 200 selects the first candidate hypothesis 135 as a final transcription 275, the NLU 220 (FIGS. 1A and 1B) will perform semantic interpretation on the transcription 275 to identify "is it funny" either as speech not directed to the AED 102 (since there is no context for what/who the term "it" corresponds to or incorrectly as the follow-on query 129 to submit to the digital assistant 109. In the case of the former, the digital assistant 109 may either ignore the follow-on query or prompt the user to re-submit the follow-on query. In the case of the latter where the incorrect transcription of "is it funny" is identified as the follow-on query 129 submitted to the digital assistant 109, the digital assistant 109 would retrieve a follow-on response 193 not related to the follow-on query 129 actually spoken by the user 10. In either scenario, the user experience is severely degraded since the digital assistant 109 was unable to return a follow-on response 193 that answered the follow-on query 129 actually spoken by the user 10.

The ASR system 200 may perform operations (C) and (D) as additional processing steps that leverage the initial/previous query 117 for biasing the selection of the candidate hypothesis 225 from the multiple candidate hypotheses 225 based on a topical similarity to the initial/previous query 117. At operation (C), the QBST module 230 receives the set of highest ranking candidate hypotheses 225, 225a—n and determines a corresponding set of candidate QBST vectors 235, 235a—n each associated with a corresponding one of the set of highest ranking candidate hypotheses 225. The QBST module 230 similarly receives the previous query 117 (e.g., the initial query 117 of "What is the temperature in Detroit") and determines a corresponding previous QBST vector 217. If the current follow-on query being processed corresponds to a second or later follow-on query during an on-going continued conversation between the user 10 and the digital assistant 109, the QBST 230 may optionally receive multiple previous queries 117 from the continued conversation and determine corresponding previous QBST vectors 217 for each of the multiple previous queries 117. For simplicity, the present disclosure will only describe the QBST 230 receiving only a single previous query 117.

Each QBST vector 217, 225 may indicate a set of salient terms each with a corresponding weight. For instance, the previous QBST vector 217 corresponding to the previous query 117 ("What is the temperature in Detroit?") may indicate a corresponding set of salient terms (with high weight) that includes, without limitation, "temperature", "weather", "forecast", "warm", "cool", etc. On the other hand, a first candidate QBST vector 235a corresponding to the highest ranking, but incorrect, first candidate hypothesis 225 of "is it funny" may indicate a corresponding set of salient terms that includes "funny", "joke", "comedy", etc., while a second candidate QBST vector 235b corresponding to the correct second candidate hypothesis of "is it sunny" may indicate a corresponding set of salient terms that includes "sun", "clear sky", "weather", "forecast", etc. that shares more salient terms with the previous query 117.

At operation (D), the similarity scorer 240 receives the previous and candidate QBST vectors 217, 235 and determines, for each of the candidate hypotheses 225, 225a-n, a corresponding similarity metric 245, 245a—n between the corresponding previous QBST vector 217 and the corresponding candidate QBST vector 235 output from the QBST module 230 for the corresponding candidate hypothesis 225. Stated differently, the similarity scorer 240 compares the previous QBST vector 217 to each of the candidate QBST vectors 235 to determine the similarity metrics 245 each indicating a topical drift between the previous QBST vector 217 and the corresponding candidate QBST vector 235. Each similarity metric 245 may include a similarity score between the previous QBST vector 217 and the corresponding candidate QBST vector 235. In some examples, the each similarity metric 245 includes a Cosine score/distance between the previous QBST vector 217 and the corresponding candidate QBST vector 235 to account for term weights in the pair of QBST vectors 217, 235. For example, continuing with the example above, similarity metrics 245 including the Cosine scores between the previous QBST vector 217 and each of the first and second candidate QBST vectors 235a, 235b may be represented as follows:

Similarity(what is the temperature in Detroit, is it funny)=0.001

Similarity(what is the temperature in Detroit, is it sunny)=0.793

Accordingly, the ASR system 200 may use the similarity metrics 245 (e.g., Cosine scores) output by the similarity scorer 240 for each of the highest ranking candidate hypotheses 225 identified during operation (B) for selecting the final transcription 275 to indicate the follow-on query 129 that will ultimately be processed by the digital assistant 109. For instance, in the example above, the second candidate hypothesis 225b of "Is it sunny", despite having a lower likelihood score 155 than the top-ranked second candidate hypothesis 225a of "Is it funny", is associated with a higher similarity score 245, and thus, more similar to the overall topic of the previous query 117 in the conversation with the digital assistant 109. That is, by the intuition that a current follow-on query is on a same overall topic as a previous query, the QBST module 230 and the similarity scorer 240 enable the ASR system 200 to select the one of the candidate hypotheses 225 that is most similar to the previous query 117 as the correct final transcription 275 for the follow-on query 129 actually spoken by the user 10.

The similarity scorer 240 may be adapted to consider multiple different similarities between the previous query 117 and the multiple candidate hypotheses 225. In one similarity consideration, as detailed above, the similarity scorer 240 determines similarity metrics 245 between the previous query 117 and each of N alternative candidate hypotheses 225 such that the candidate hypotheses may be sorted/ranked based on their similarity to the previous query. In an additional similarity consideration, the similarity scorer 240 determines similarity metrics 245 between the candidate hypotheses 225 to enable pruning of some candidate hypotheses 225 that are not meaningful different from the previous query 117. For instance, if the top candidate hypotheses 225 were "it sunny" and one of the other alternative candidate hypotheses 225 is "is it sunny", the alternative can be pruned and removed from consideration since it is close enough to the top candidate hypotheses 225 that it would result in retrieval of the same follow-on response 193. In this scenario, it is possible to select two of the candidate hypotheses 225 for processing by the NLU model 220 and fulfillment to ultimately determine which one results in retrieval of the best follow-on response 193. In yet another additional similarity consideration, the similarity scorer 240 determines how much closer in similarity an alternative candidate hypothesis 225 is to the previous query 118 than an original (e.g. highest-ranking) candidate hypothesis 225 using the following equation:

Similarity(previous query,alternative candidate hypothesis)−Similarity(previous query, highest-ranked candidate hypothesis Here, the equation estimates an improvement that allows the ASR system 200 attempting to select alternative candidate hypotheses 225 that are meaningful different from the highest-ranked candidate hypothesis but not much meaningful different than the previous query 118. For instance, considering the previous query of "temperature in New York" and the candidate hypotheses for a follow-on query that include "is there sun in Newark" and "is there fun in New York", the sharing of salient terms of "sun", "weather", "temperature" could potentially result in selecting the candidate hypothesis "is there sun in Newark". However, because the alternative replaces "New York" with "Newark", which is less likely to be a correct transcription, any improvement deemed by similarity in topic can be weighted accordingly so that an unlikely alternative candidate hypotheses is not selected even though it is more on the same topic as the initial query 117.

During operation (E), the re-ranker 250 receives the similarity metrics 245 and the similarity scores/metrics 225 for the candidate hypotheses 225 from the similarity scorer 240 and the likelihood scores 155 for the candidate hypotheses 225 from the ASR model 210. The re-ranker 250 is configured to output a re-ranked result 255 that includes rankings for the multiple candidate hypotheses 225 based biased likelihood scores 156. In the example shown, the re-ranked result 255 includes the candidate hypothesis 225 for "is it sunny" with a biased likelihood score 156 of 0.8 as the most likely correct transcription 275. The NLU model 220 may perform semantic analysis on the correct transcription 275 to identify the appropriate follow-on query 129 for fulfillment by the digital assistant 109.

Additionally or alternatively, the QBST module 230 may determine a QBST vector for the response 192 to the initial query 117 submitted by the user and determine a corresponding similarity metric between each candidate QBST vector 235 and the QBST vector determined for the response 192 to the initial query 117. Thus, selection of the candidate hypotheses for the final transcription 275 of the follow-on query 129 may be biased based on a topical similarity between the response 192 to the initial query 117 and each of the candidate hypotheses.

Figure 4:
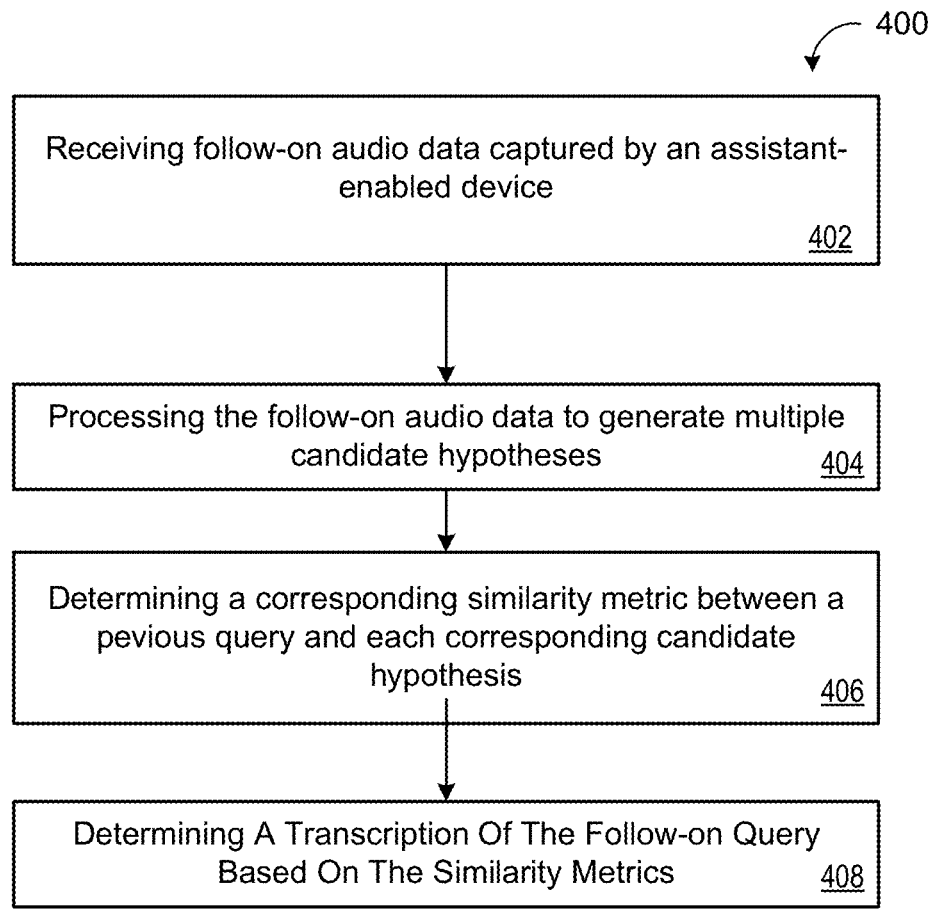
FIG. 4 is a flowchart of an example arrangement of operations for a method of history-based ASR mistake correction for a follow-on query.

FIG. 4 is a flowchart of an example arrangement of operations for a method 400 of transcribing follow-on audio data during operation of an assistant-enabled device 102 in a continued conversation mode. The method 400 may include a computer-implemented method that executes on the data processing hardware 103 of the assistant-enabled device 102 or the data processing hardware 112 of the remote system 110 of FIG. 1. At operation 402, the method 400 includes receiving follow-on audio data 127 captured by the AED 102. Here, the follow-on audio data 127 may correspond to a follow-on query 129 spoken by a user 10 of the AED 102 to a digital assistant 109 subsequent to the user 10 submitting a previous query 117 to the digital assistant 109. The AED 102 may capture the follow-on audio data 127 while operating in a continued conversation mode after the user 10 submitted the previous query 117. During operation in the continued conversation mode, the AED 102 is awake and instructs a speech recognizer 210 to perform speech recognition on audio data captured by the AED 102 without requiring the user to explicitly speak a predetermined hotword.

At operation 404, the method 400 includes processing, using a speech recognizer 210, the follow-on audio data 127 to generate multiple candidate hypotheses 225. Each candidate hypothesis 225 corresponds to a candidate transcription for the follow-on query 129 and is represented by a respective sequence of hypothesized terms.

At operation 406, for each corresponding candidate hypothesis 225 among the multiple candidate hypotheses, the method 400 also includes determining a corresponding similarity metric 245 between the previous query 117 and the corresponding candidate hypothesis 225. Here, the similarity metric indicates a similarity between a topic associated with the corresponding candidate hypothesis and a topic associated with the previous query. In some examples, the similarity metric includes a Cosine distance between a QBST vector 217 associated with the previous query 117 and a corresponding candidate QBST vector 235 associated with the corresponding candidate hypothesis 225. At operation 408, the method 400 includes determining a transcription 225 of the follow-on query 129 spoken by the user based on the similarity metrics 245 determined for the multiple candidate hypotheses 225.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
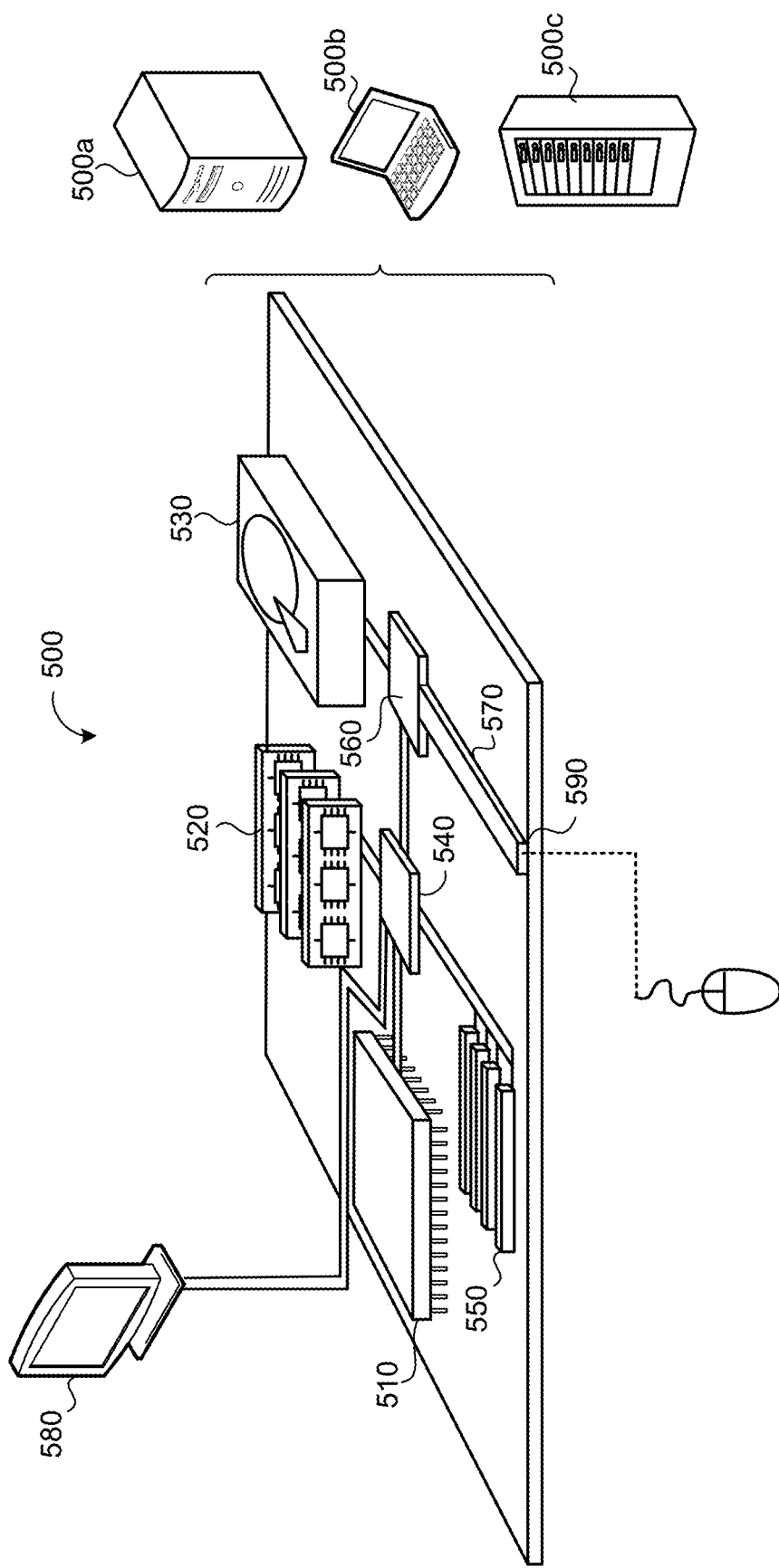
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware causes the data processing hardware to perform operations comprising:
   receiving initial audio data captured by an assistant-enabled device while the assistant-enabled device is in a sleep state, the initial audio data comprising a hotword and a previous query submitted by a user of the assistant-enabled device to the digital assistant, the hotword when detected by the assistant-enabled device causing the assistant-enabled device to wake from a sleep state and trigger a speech recognizer to perform speech recognition on at least a portion of the initial audio data that includes the previous query;
   after the speech recognizer performs speech recognition on at least the portion of the initial audio data, instructing the assistant-enabled device to operate in a follow-on query mode
   receiving follow-on audio data captured by the assistant-enabled device during operation of the assistant-enabled device in the follow-on query mode, the follow-on audio data corresponding to a follow-on query spoken by the user of the assistant-enabled device to the digital assistant subsequent to the user submitting the previous query to the digital assistant;
   processing, using the speech recognizer, the follow-on audio data to generate multiple candidate hypotheses, each candidate hypothesis corresponding to a candidate transcription for the follow-on query and represented by a respective sequence of hypothesized terms;
   for each corresponding candidate hypothesis among the multiple candidate hypotheses:
      determining a corresponding similarity metric between the previous query and the corresponding candidate hypothesis, the similarity metric indicating a similarity between a topic associated with the corresponding candidate hypothesis and a topic associated with the previous query; and
      obtaining a corresponding likelihood score that the speech recognizer assigned to the corresponding candidate hypothesis;
   ranking the multiple candidate hypotheses based on the corresponding likelihood scores assigned to the multiple candidate hypotheses by the speech recognizer and the corresponding similarity metrics determined for each of the corresponding candidate hypotheses among the multiple candidate hypotheses; and
   determining a transcription of the follow-on query spoken by the user based on the ranking of the multiple candidate hypotheses.

2. The computer-implemented method of claim 1, wherein the operations further comprise:
   determining a previous Query Based Salient Terms (QBST) vector associated with the previous query submitted by the user; and
   for each of the corresponding candidate hypotheses, determining a corresponding candidate QBST vector associated with the corresponding candidate hypothesis,
   wherein determining the corresponding similarity metric between the previous query and the corresponding candidate hypothesis comprises determining the corresponding similarity metric between the previous QBST vector and the corresponding candidate QBST vector based on the previous QBST vector and the corresponding candidate QBST vector.

3. The computer-implemented method of claim 2, wherein:
   the previous QBST vector indicates a respective set of salient terms associated with the previous query; and
   each of the corresponding candidate QBST vectors indicates a respective set of salient terms associated with the corresponding candidate hypothesis.

4. The computer-implemented method of claim 2, wherein the corresponding similarity metric indicates a topical drift between the previous QBST vector and the corresponding candidate QBST vector.

5. The computer-implemented method of claim 2, wherein the corresponding similarity metric comprises a Cosine score between the previous QBST vector and the corresponding candidate QBST vector.

6. The computer-implemented method of claim 1, wherein the presence of the hotword is absent from the follow-on audio data.

7. The computer-implemented method of claim 1, wherein the operations further comprise:
performing query interpretation on the transcription to identify an operation specified by the follow-on query;
instructing the digital assistant to perform the operation specified by the follow-on query; and
receiving, from the digital assistant, a follow-on response indicating performance of the operation specified by the follow-on query.

8. The computer-implemented method of claim 7, wherein the operations further comprise presenting, for output from the assistant-enabled device, the follow-on response.

9. The computer-implemented method of claim 1, wherein the data processing hardware resides on the assistant-enabled device and executes the speech recognizer.

10. The computer-implemented method of claim 1, wherein the data processing hardware resides on a remote server and executes the speech recognizer, the remote server in communication with the assistant-enabled device via a network.

11. The computer-implemented method of claim 1, wherein the speech recognizer comprises an end-to-end speech recognition model.

12. The computer-implemented method of claim 1, wherein the speech recognizer comprises an acoustic model and a language model.

13. The computer-implemented method of claim 1, wherein the assistant-enabled device is in communication with one or more microphones configured to capture the follow-on audio data and the initial audio data corresponding to the previous query.

14. The computer-implemented method of claim 1, wherein the assistant-enabled device comprises a battery-powered device.

15. A system comprising:
data processing hardware; and
memory hardware in communication with the data processing hardware and storing instructions that when executed on the data processing hardware cause the data processing hardware to perform operations comprising:
receiving initial audio data captured by an assistant-enabled device while the assistant-enabled device is in a sleep state, the initial audio data comprising a hotword and a previous query submitted by a user of the assistant-enabled device to the digital assistant, the hotword when detected by the assistant-enabled device causing the assistant-enabled device to wake from a sleep state and trigger a speech recognizer to perform speech recognition on at least a portion of the initial audio data that includes the previous query;
after the speech recognizer performs speech recognition on at least the portion of the initial audio data, instructing the assistant-enabled device to operate in a follow-on query mode receiving follow-on audio data captured by the assistant-enabled device during operation of the assistant-enabled device in the follow-on query mode, the follow-on audio data corresponding to a follow-on query spoken by the user of the assistant-enabled device to the digital assistant subsequent to the user submitting the previous query to the digital assistant;
processing, using the speech recognizer, the follow-on audio data to generate multiple candidate hypotheses, each candidate hypothesis corresponding to a candidate transcription for the follow-on query and represented by a respective sequence of hypothesized terms;
for each corresponding candidate hypothesis among the multiple candidate hypotheses:
determining a corresponding similarity metric between the previous query and the corresponding candidate hypothesis, the similarity metric indicating a similarity between a topic associated with the corresponding candidate hypothesis and a topic associated with the previous query; and
obtaining a corresponding likelihood score that the speech recognizer assigned to the corresponding candidate hypothesis;
ranking the multiple candidate hypotheses based on the corresponding likelihood scores assigned to the multiple candidate hypotheses by the speech recognizer and the corresponding similarity metrics determined for each of the corresponding candidate hypotheses among the multiple candidate hypotheses; and
determining a transcription of the follow-on query spoken by the user based on the ranking of the multiple candidate hypotheses.

16. The system of claim 15, wherein the operations further comprise:
determining a previous Query Based Salient Terms (QBST) vector associated with the previous query submitted by the user; and
for each of the corresponding candidate hypotheses, determining a corresponding candidate QBST vector associated with the corresponding candidate hypothesis,
wherein determining the corresponding similarity metric between the previous query and the corresponding candidate hypothesis comprises determining the corresponding similarity metric between the previous QBST vector and the corresponding candidate QBST vector based on the previous QBST vector and the corresponding candidate QBST vector.

17. The system of claim 16, wherein:
the previous QBST vector indicates a respective set of salient terms associated with the previous query; and
each of the corresponding candidate QBST vectors indicates a respective set of salient terms associated with the corresponding candidate hypothesis.

18. The system of claim 16, wherein the corresponding similarity metric indicates a topical drift between the previous QBST vector and the corresponding candidate QBST vector.

19. The system of claim 15, wherein the corresponding similarity metric comprises a Cosine score between the previous QBST vector and the corresponding candidate QBST vector.

20. The system of claim 15, wherein the presence of the hotword is absent from the follow-on audio data.

21. The system of claim 15, wherein the operations further comprise:

performing query interpretation on the transcription to identify an operation specified by the follow-on query;

instructing the digital assistant to perform the operation specified by the follow-on query; and receiving, from the digital assistant, a follow-on response indicating performance of the operation specified by the follow-on query.

22. The system of claim 21, wherein the operations further comprise presenting, for output from the assistant-enabled device, the follow-on response.

23. The system of claim 15, wherein the data processing hardware resides on the assistant-enabled device and executes the speech recognizer.

24. The system of claim 15, wherein the data processing hardware resides on a remote server and executes the speech recognizer, the remote server in communication with the assistant-enabled device via a network.

25. The system of claim 15, wherein the speech recognizer comprises an end-to-end speech recognition model.

26. The system of claim 15, wherein the speech recognizer comprises an acoustic model and a language model.

27. The system of claim 15, wherein the assistant-enabled device is in communication with one or more microphones configured to capture the follow-on audio data and the initial audio data corresponding to the previous query.

28. The system of claim 15, wherein the assistant-enabled device comprises a battery-powered device.

* * * * *